United States Patent [19]

Schmid

[11] Patent Number: 5,702,314

[45] Date of Patent: Dec. 30, 1997

[54] DEVICE FOR DAMPING SPRING VIBRATIONS

[75] Inventor: Michael Schmid, Höchstadt/Aisch, Germany

[73] Assignee: Ina Wälzlager Schaeffler KG, Herzogenaurach, Germany

[21] Appl. No.: 765,155

[22] PCT Filed: Apr. 1, 1995

[86] PCT No.: PCT/EP95/01217

§ 371 Date: Dec. 11, 1996

§ 102(e) Date: Dec. 11, 1996

[87] PCT Pub. No.: WO96/03598

PCT Pub. Date: Feb. 8, 1996

[30] Foreign Application Priority Data

Jul. 28, 1994 [DE] Germany .................. P 44 26 666.9

[51] Int. Cl.⁶ ...................................................... F16D 3/12
[52] U.S. Cl. ............................................ 474/94; 474/135
[58] Field of Search ............................. 474/94, 101, 109, 474/133, 135

[56] References Cited

U.S. PATENT DOCUMENTS

| | | |
|---|---|---|
| 4,886,484 | 12/1989 | Hanes . |
| 4,889,520 | 12/1989 | Brandenstein et al. .................. 474/135 |
| 5,236,396 | 8/1993 | Golovatai-Schmidt et al. ... 474/135 X |

FOREIGN PATENT DOCUMENTS

| | | |
|---|---|---|
| 32 25 411 | 2/1983 | Germany . |
| 37 28 158 | 3/1989 | Germany . |

*Primary Examiner*—Roger J. Schoeppel
*Attorney, Agent, or Firm*—Henry M. Feiereisen

[57] ABSTRACT

The invention concerns a tensioner for traction drives which includes a base element and a tension roller support arranged partly concentric with each other, and further including a torsion spring which is guided on a bush and braces these two elements against each other. According to the invention, a tension bush (20) which includes a longitudinal slot (21) is inserted between the bush (6) and the inner diameter of the torsion spring (13) so as to bear against the inner periphery of the torsion spring (13).

7 Claims, 1 Drawing Sheet

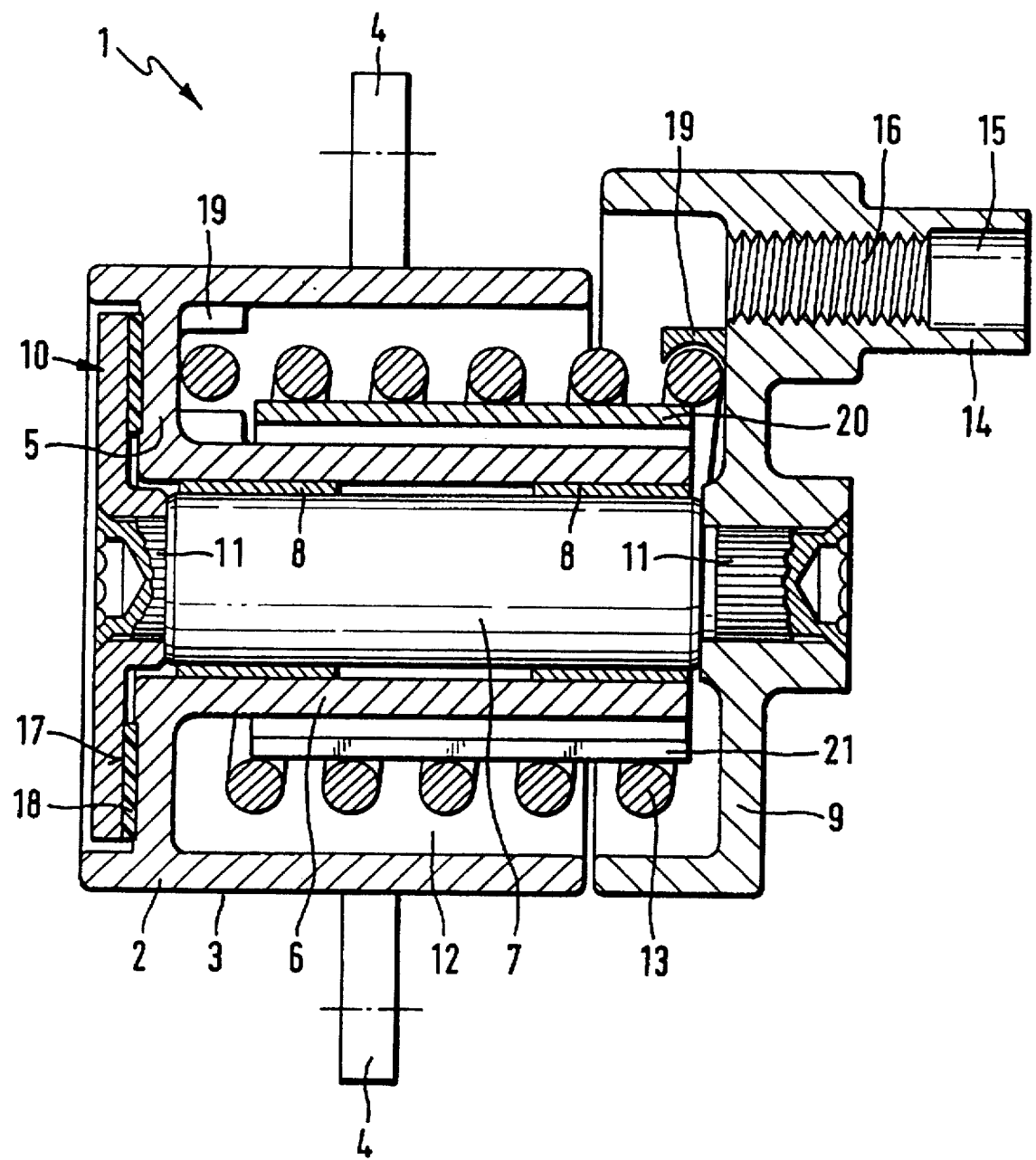

DEVICE FOR DAMPING SPRING VIBRATIONS

BACKGROUND OF THE INVENTION

The invention concerns a tensioner for traction drives comprising a base element and a pivoting element in the from of a tension roller support arranged partly concentric with each other, and further comprising a torsion spring guided on a bush for bracing the base element and the tension roller support against each other, said torsion spring causing a displacement of the tension roller support into an end position in which a tension roller tightens the tension drive, the tension roller support being connected to a friction element for damping adjusting movements.

In a tensioner of the above type known from DEC 32 25 411, a tension roller support is mounted with the help of a bush on an axle of the base element. The bush is surrounded by a torsion spring which is clamped between the base element and the tension roller support. The end of the spring bearing against the base element is supported on an annular flange of a bush-like bearing element which is guided on the bush of the tension roller support. The bearing element has a radially stepped peripheral surface and a longitudinal dimension corresponding to a part of the spring length. The bearing element is configured such that at least the end region of the torsion spring at the end oriented towards the annular flange bears directly against the peripheral surface of the bearing element.

Disadvantageously, due to the partial contact of the spring with the bearing element in this prior art, the radial movement of the spring coils on a pivoting of the tension roller support is limited to only a few coils. During high-frequency adjusting movements of the tension roller support, this structure can give rise to sympathetic vibrations which can result in the destruction of the spring accompanied by a failure of the tensioner.

SUMMARY OF THE INVENTION

It is an object of the invention to create an improved tensioner of the above type which possesses higher safety against failure of the torsion spring and assures a damping of noises in the tensioner by cost-effective measures.

The invention achieves this object by providing a base element; a pivoting element in the form of a tension roller support arranged partially concentric with each other; a torsion spring guided on a bush for bracing the base element and the tension roller support against each other, with th torsion spring causing a displacement of the tension roller support into an end position in which a tension roller tightens the tension drive, and with the tension roller support being connected to a friction element for damping adjusting movements; and a tension bush positioned between the bush and the torsion spring so as to bear against an inner periphery of the torsion spring, with the torsion spring having a length which corresponds to the length of the torsion spring and including a longitudinal slot.

According to the invention, a tension bush having a longitudinal slot is disposed in the annular space between the torsion spring and the bush. The tension bush which, in the installed state, extends over almost the entire length of the torsion spring, is configured so as to bear against the inner periphery of the torsion spring. Due to the longitudinal slot, the tension bush is pre-tensioned and deformable and can therefore adapt itself to changes in the inner diameter of the torsion spring which come about on a displacement of the tension roller support of the tensioner. By reason of a permanent abutment of all the spring coils against the tension bush, detrimental spring vibrations are advantageously prevented by the tension bush. At the same time, disadvantageous noise generation due to spring vibrations is obviated and an effective protection is achieved against sympathetic vibrations which can lead to a breaking of the spring. The tension bush of the invention constitutes an economic means which can be mounted by a simple insertion of the tension bush into the torsion spring and improves the operational life of the torsion spring and consequently, the operatability of the tensioner.

Advantageously, the outer diameter of the tension bush in the non-installed state is larger than the inner diameter of the torsion spring in the installed state. Due to this overlap, the tension bush is force-locked or pre-tensioned against the torsion spring. The configuration of the tension bush not only damps the spring vibrations but also promotes the damping action of the friction element. Due to its force-locked abutment against the interior of the torsion spring, the tension bush of the invention does not require any positional or rotational fixing.

According to another feature of the present invention, the wall thickness of the tension bush corresponds to approximately half the value of the distance obtained between the peripheral surface of the bush and the inner diameter of the torsion spring. This configuration guarantees an adequate rigidity of the tension bush which forestalls the danger of possible sympathetic vibrations of the coils of the torsion spring. Besides this, there remains a sufficiently large empty radial space for the torsion spring whose coils are displaced radially inward during adjusting movements of the pivoting element so that the damping properties of the torsion spring are not prejudiced when the tension bush comes to abut against the peripheral surface of the bush.

According to yet another feature of the present invention, starting from the pivoting element, the tension bush is conically widened inside. In this way, the rigidity of the tension bush is adapted to the load on the torsion spring whose radial displacements are largest in the region of the tension roller support. This configuration therefore advantageously influences the loading of the torsion spring so that its deformation is transmitted to a greater number of coils. Preferably, the tension bush is made of a permanently elastic material such as, for example, a plastic or a spring steel. In particular, the material used is a polymeric material which permits an economic production of the tension bush and helps to meet the requirement of a noise-damping tension bush. Suitable wear-resistant plastics are, in particular, thermoplastics or reinforced plastics such as, for example, PA 66 GF.

According to another embodiment of the invention, two tension bushes are arranged concentric with each other inside the torsion spring. To avoid a registering of their slots, the two tension bushes are installed with the slots offset by 180° to each other.

BRIEF DESCRIPTION OF THE DRAWINGS

The above and other objects, features and advantages of the present invention will now be described in more detail with reference to the accompanying drawing in which the sole FIGURE shows a sectional view of one embodiment of a tensioner according to the present invention.

The structure of the tensioner 1 of the invention can be seen more clearly in the sectional view. The tensioner 1 comprises a base element 2 which has a generally rotationally symmetric configuration and is provided on a peripheral surface 3 with two brackets 4 situated radially opposite each other for fixing the tensioner 1, for example, on a crankcase of an internal combustion engine. Starting from a bottom 5, a bush 6 is arranged centrally in the base element 2 and extends axially beyond the end of the peripheral surface 3 opposite the bottom 5. The bush 6 serves to lodge and mount a shaft 7 which is supported on sliding bearing bushes 8 and connects a tension roller support 9 to a friction disc 10.

DESCRIPTION OF PREFFERED EMBODIMENTS

To obtain a non-rotatable connection, the tension roller support 9 and the friction disc 10 are secerely connected to the shaft 7 for preventing relative rotation therebetween by gearings 11 provided on shouldered ends of the shaft 7 which are swaged respectively to the tension roller support 9 and the friction disc 10. In a cavity 12 of the base element 12 extending axially from the bottom 5 of the base element 2 upto the pivoting element 9, there is arranged a torsion spring 13 which is configured as a coil spring and, in the operating position of the tensioner 1, constantly pivots the tension roller support 9 into a position which raises the tension in the traction drive. To rotationally fix the torsion spring 13, its ends are secured to the bottom 5 and the pivoting element 9 respectively by sheet metal retainers 19. A tension bush 20 comprising a longitudinal slot 21 bears against the inner periphery of the torsion spring 13. The tension bush 20 which is inserted with a radially outward directed pre-tension advantageously prevents detrimental natural and sympathetic vibrations of the torsion spring 13. At its end opposite the base element 2, the pivoting element 9 comprises an eccentric housing 14 which is provided with a fitting bore 15 and, next to this, with a threaded bore 16. These bores serve to receive and fix a tension roller, not shown, connected to the traction drive. The friction disc 10 fixed on the tension roller support 9 and cooperating with the base element bears by an annular friction surface 17 against the friction lining 18.

An axial force exerted by the torsion spring 13 on the tension roller support 9 is transmitted through the shaft 7 to the friction disc 10 which exerts a force on the friction lining 18 and thus effects a damping of the movements of the tensioner roller support e.g., when impact loading occurs in the traction drive. To prevent detrimental vibrations of the torsion spring 13 which often lead to noise generation, the tension bush 20 is inserted into the torsion spring 13 so as to bear against the inner periphery thereof. The base element 2 is configured such that a peripheral surface thereof 3 extends axially beyond the bottom 5 so that the friction lining 18 is axially and radially overlapped and, with the help of the friction disc 10, almost completely protected on all sides.

What is claimed is:

1. A tensioner for traction drives, comprising a base element and a pivoting element in the form of a tension roller support arranged partially concentric with each other; a torsion spring guided on a bush for bracing the base element and the tension roller support against each other, said torsion spring causing a displacement of the tension roller support into an end position in which a tension roller tightens the tension drive, wherein the tension roller support is connected to a friction element for damping adjusting movements; and a tension bush (20) substantially corresponding in length to the tension spring (13) and comprising a longitudinal slot (21), said tension bush being inserted between the bush (6) and the torsion spring (13) so as to bear against an inner periphery of the torsion spring (13).

2. A tensioner of claim 1, wherein an outer diameter of the tension bush (20) in a non-installed state is larger than an inner diameter of the torsion spring (13) in an installed state.

3. A tensioner of claim 1, wherein a wall thickness of the tension bush (20) corresponds to approximately half the value of a distance obtained between a peripheral surface of the bush (6) and an inner diameter of the torsion spring (13).

4. A tensioner of claim 1, wherein, starting from the pivoting element (9), the tension bush (20) is conically widened inside.

5. A tensioner of claim 1, wherein the tension bush (20) is made of a permanently elastic material.

6. A tensioner of claim 1, wherein the tension bush (20) is made of a plastic, in particular of a thermoplastic or a reinforced plastic such as PA 66 GF.

7. A tensioner of claim 1 comprising two tension bushes (20) which are concentric with each other and are arranged such that their longitudinal slots (21) are offset by 180° to each other.

* * * * *